United States Patent
Ng

(10) Patent No.: US 7,804,770 B2
(45) Date of Patent: Sep. 28, 2010

(54) METHOD AND APPARATUS FOR PERFORMING A GRACEFUL RESTART IN A NSF-CAPABLE ROUTER WITHOUT ENHANCING LINK STATE ROUTING PROTOCOLS

(75) Inventor: Billy Ng, Wakefield, MA (US)

(73) Assignee: General Instrument Corporation, Horsham, PA (US)

( * ) Notice: Subject to any disclaimer, the term of this patent is extended or adjusted under 35 U.S.C. 154(b) by 163 days.

(21) Appl. No.: 11/864,072

(22) Filed: Sep. 28, 2007

(65) Prior Publication Data

US 2009/0086622 A1 Apr. 2, 2009

(51) Int. Cl.
*H04L 12/26* (2006.01)

(52) U.S. Cl. .................... 370/219; 370/225; 370/389

(58) Field of Classification Search .................. 370/217, 370/218, 219, 220, 225, 228, 352, 356, 389, 370/390, 392, 428
See application file for complete search history.

(56) References Cited

U.S. PATENT DOCUMENTS

| | | | |
|---|---|---|---|
| 6,483,833 B1 * | 11/2002 | Jagannath et al. ........... 370/392 |
| 6,744,775 B1 * | 6/2004 | Beshai et al. ............... 370/409 |
| 2002/0024934 A1 | 2/2002 | Galand et al. |
| 2003/0081553 A1 | 5/2003 | Bitar |
| 2006/0013125 A1 * | 1/2006 | Vasseur et al. .............. 370/217 |
| 2006/0018333 A1 | 1/2006 | Windisch et al. |
| 2006/0159082 A1 | 7/2006 | Cook et al. |
| 2006/0215547 A1 | 9/2006 | Koppol |
| 2006/0262735 A1 | 11/2006 | Guichard et al. |
| 2006/0294211 A1 | 12/2006 | Amato |
| 2007/0008949 A1 * | 1/2007 | Balandin .................... 370/351 |
| 2007/0014231 A1 | 1/2007 | Sivakumar et al. |
| 2007/0047447 A1 | 3/2007 | Mirtorabi et al. |
| 2007/0083907 A1 | 4/2007 | Serbest et al. |
| 2007/0127457 A1 | 6/2007 | Mirtorabi et al. |
| 2007/0165543 A1 | 7/2007 | Joo |
| 2008/0084890 A1 * | 4/2008 | Kompella .................. 370/400 |
| 2009/0016356 A1 * | 1/2009 | He et al. ................. 370/395.31 |
| 2009/0067331 A1 * | 3/2009 | Watsen et al. ............... 370/235 |
| 2009/0100193 A1 * | 4/2009 | Natarajhan et al. .......... 709/239 |

OTHER PUBLICATIONS

OSPF Design Guide, http://www.cisco.com/warp/customer/104/1.html, 58 pages, downloaded Apr. 7, 2006.
RFC 3623 (RFC3623)-Graceful OSPF Restart, http://www.faqs.org/rfcs/rfc3623.html, 14 pages, downloaded Aug. 3, 2007.

* cited by examiner

*Primary Examiner*—Chi H. Pham
*Assistant Examiner*—Kevin Mew
(74) *Attorney, Agent, or Firm*—Larry T. Cullen

(57) ABSTRACT

A graceful restart is provided in a NSF capable router. When a switchover to a standby controller is required, the standby controller receives replicated link state message headers from an active controller. The standby controller generates a link state request (LSR) message from the link state message headers and transmits the LSRs to neighboring routers. The standby controller receives a link state update that includes the link state messages. By using the LSRs, the standby controller can be quickly synchronized with its neighbors well within the grace period, thereby maintaining adjacency.

20 Claims, 3 Drawing Sheets

METHOD AND APPARATUS FOR PERFORMING A GRACEFUL RESTART IN A NSF-CAPABLE ROUTER WITHOUT ENHANCING LINK STATE ROUTING PROTOCOLS

FIELD OF THE INVENTION

The present invention relates generally to a method and apparatus for providing link state routing protocol redundancy in a router, and more specifically to a method and apparatus for migrating link state routing protocol processing from one routing processor to another processor using a graceful restart procedure.

BACKGROUND OF THE INVENTION

Routers and switches are network devices that determine which communication link or links to employ to support the progress of data packets through the network. A network node that determines which links to employ based on information in the network (OSI layer 3) is called a router. Link state routing protocols such as Border Gateway Protocols ("BGP") and Interior Gateway Protocols ("IGP") enable each router to understand which other router is the "next hop" that a packet should take towards its destination. One example of an IGP is the Open Shortest Path First Protocol ("OSPF"). Routers use the routing protocols to construct routing tables. Thereafter, when a router receives a data packet and has to make a forwarding decision, the router locates the next hop in the routing table. Conventionally, the routers look up the routing table using the destination IP address provided in the data packet as an index.

OSPF and similar link state routing protocols use a Hello protocol (e.g., the OSPF Hello protocol) to acquire neighbors, which are other routers with interfaces to a common network. The router sends Hello packets to its neighbors and receives their hello packets. In addition to helping acquire neighbors, Hello packets also act as "keepalives," which are messages that let routers know that other routers are still functional. On multi-access networks (networks supporting more than two routers), the Hello protocol elects a designated router and a backup designated router. When the topological databases of two neighboring routers are synchronized, the routers are said to be adjacent or collectively form an adjacency. Adjacencies control the distribution of routing-protocol packets, which are sent and received only on adjacencies. In particular, link state messages such as Link State advertisements (LSAs) are exchanged among adjacent routers to communicate routing and topology information. Each router periodically sends its LSAs to provide information on the router's adjacencies or to inform others when a router's state changes. By comparing established adjacencies to link states, failed routers can be detected quickly, and the network's topology can be altered appropriately.

The infrastructure of a router typically comprises functional components organized as a control plane and a data plane. The control plane includes the functional components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

The control plane generally tends to be more complex than the data plane in terms of the quality and quantity of software operating on the supervisor processor. Therefore, failures are more likely to occur in the control processor when executing such complicated code. In order to ensure high availability in a router, it is desirable to configure the router such that if a failure arises with the control plane that requires restarting of software executing on the control processor, the data plane continues to operate correctly. Restarting of control plane software may be necessary because of a failure with a routing protocol component or a software upgrade to that component. A router that is configured to enable its data plane to continue packet forwarding operations during restart of the control plane software is referred to as a non-stop forwarding (NSF) capable router.

Situations where a NSF capable router architecture is useful include both anticipated and non-anticipated failures in the control plane of the router. For example, failures in the control plane can include unanticipated or unplanned events (e.g., software crashes or hardware errors) as well as planned or anticipated events (e.g., scheduled maintenance). As for the latter, it may be desired to upgrade software running on the control processor or even remove and replace that processor for service. Such an upgrade or removal/replacement may cause an interruption in one or more routing protocols, but the NSF nature of the router allows continued forwarding of data through the router.

NSF router architectures have been implemented to enhance router availability and avoid disruption of data connectivity. These previous implementations often require modifications to routing protocols such as OSPF to add support for NSF and related processes. For example, modifications to the OSPF routing protocol allow support for a so-called graceful restart after a link state router protocol failure. When the router is restarted, the modified protocol allows the router to obtain information via protocol message exchanges with its neighbors and without the neighbors "viewing" the router as being completely down, thereby obviating any changes to the routing topology.

Unfortunately, conventional graceful restart processes require both the failed router and its neighbors to support graceful restart extensions or enhancements to the link state routing protocol. However, not all routers support such routing protocol extensions. Accordingly, it would be desirable to perform a graceful restart in a simple manner without the need to extend the link state routing protocol.

DETAILED DESCRIPTION

Figure 1:
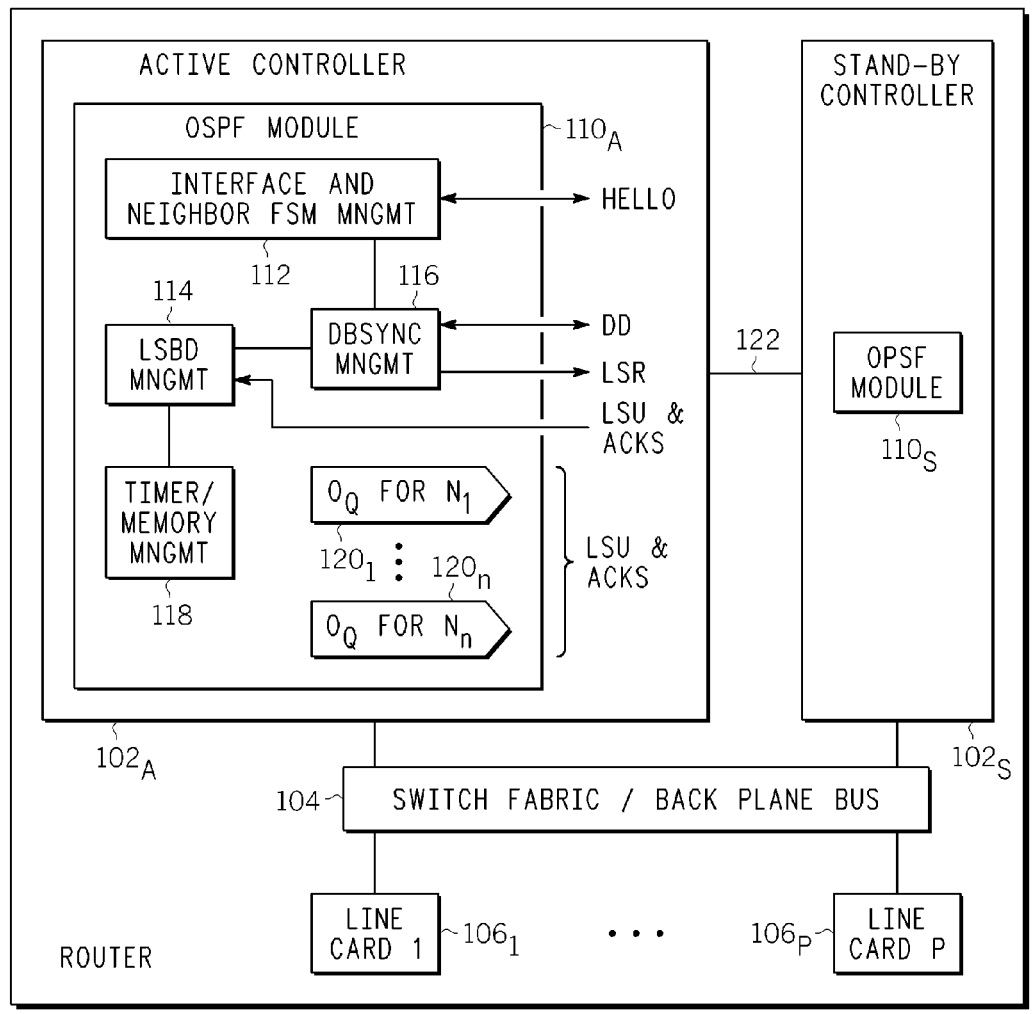
FIG. 1 depicts a high-level block diagram of one example of a router.

FIG. 1 depicts a high-level block diagram of one example of a router 100. It should be noted that router 100 is presented for purposes of illustration only. The techniques presented herein are more broadly applicable to any router architecture or any other level 3 switch capable of routing packetized information using a link state routing protocol such as OSPF or the like in a packet switched network such as the Internet. Similarly, for, purposes of illustration only the following examples will often refer to OSPF as illustrative of a link state routing protocol that may be employed.

Referring to FIG. 1, the router 100 comprises at least two controllers, such as active controller 102a and standby controller 102s (collectively controllers 102), a switch fabric 104, and a plurality of line cards $106_1$ through $106_p$ (collectively line cards 106). The line cards 106 provide external I/O interfaces with neighboring nodes, such as neighboring routers. The line cards 106 are coupled to an in-band transmission interface, such as the switch fabric 104 or a backplane bus. The line cards 106 and switch fabric 104 collectively transfer the packetized data between routers according to the routing tables generated by the active controller 102a, in accordance with one or more routing protocols, such as the OSPF protocol.

The active controller 102a and standby controller 102s are coupled to each other via a communications channel, such as the in-band switch fabric/backplane bus 104, or an out-of-band (e.g., dedicated) communications channel. The active controller 102a communicates network link protocol information over the in-band (fabric switch) channel 104 or out-of-band communication channel 122 to the standby controller 102s.

Each controller 102 comprises an OSPF module 110. FIG. 1 illustratively shows the major component sub-modules of the OSPF module 110a for the active controller 102a. However, a person skilled in the art will appreciate that the OSPF module 110s of the standby controller 102s may or may not be identical to the OSPF module 110a of the active controller 102a. Each OSPF module 112 comprises an interface and neighbor finite state machine (FSM) manager (INFSMM) 112, a link state database (LSDB) manager 114, a database sync (DBSync) manager 116, a timer/memory (TM) manager 113, and a plurality of output queues (OQ) $120_1$ through $120_n$ (collectively output queues 120).

The INFSMM 112 is responsible for tracking Hello messages to the neighboring routers, as well as the standby controller 102s. The DBSync manager 116 exchanges database descriptions with the standby controller 102s during database synchronization between the active and standby controllers, as well as between the active controller and external neighboring routers. Further, the DBSync manager, 116 sends link state requests (LSR) to the other routers in the network, as well as database descriptions (DD) to the OSPF 110s of the standby controller 102s. The LSDB manager 114 receives, stores, and processes link state updates (LSU) and acknowledgements (ACKs) from other neighboring routers in the network area. The timer and memory manager 118 provide resources for OSPF operations including, for example, memory for storing the link state database as well as timer operations for hello messaging. The output queues 120 include one queue per neighbor and each queue contains link state advertisements (LSA) or acknowledgements that need to be sent to the associated neighbor. The LSAs are removed from a queue when its receipt is acknowledged by its neighbor.

As discussed above, the present invention provides transparent switchover between controllers, for example, during a hardware/software failure of the active controller failure or during an operator directive to stop activity at the active controller 102a (e.g., for maintenance activity).

Figure 2:
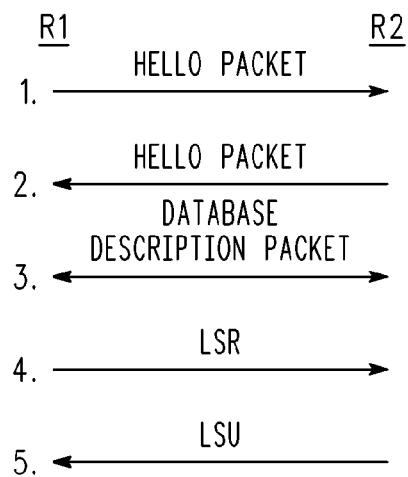
FIG. 2 is a signaling diagram showing how a first router coming online establishes its neighborhood and forms an adjacency with a second router.

FIG. 2 is a signaling diagram showing how a router R1 (e.g., router 100 in FIG. 1) coming online establishes its neighborhood and forms an adjacency with a router R2 in order to synchronize router R1's link state database located in timer and memory manager 118. As indicated at 1, the router R1 sends a hello packet or message from INFSSM 112. Once router R2 receives this packet it adds R1 to its list of neighbors. At 2, the router R2 sends a hello packet that is received by router R1. Router R1 adds router R2 to its list of neighbors. Router R1 also notices that router R2 has listed router R1's ID in its list of neighbors and thus realizes that Router R2 has received router R1's hello packet. As far as router R1 is concerned, it has now established a bi-directional relationship with router R2. The next hello packet that router R1 sends will include the ID of router R2 and thus router R2 will also recognize that it has now established a bi-directional relationship with router R1. This process of exchanging hello packets is repeated for every router on the network. The routers continue to send new Hello packets at specified intervals, generally every few seconds.

At 3 in FIG. 2, both routers R1 and R2 exchange Database Description packets using the DBSynch manager 116. The Database Description packets summarize the knowledge of each router. In particular, the Database Description packets contain the LSA headers for every LSA that the router possesses. When both sides have finished exchanging Database Description packets, each router knows which LSAs the other router has since this information is specified in the LSA headers it has received in the Database Description packets. Each router goes over the list of LSA headers that it has received and identifies the LSAs that it needs. At 4, router R1 sends a Link State Request (LSR), which requests the LSAs that it is missing from router R2. Router R2 responds to the LSR from router R1 by sending at 5 a Link State Update (LSU) which includes the LSAs that router R1 is missing. At this point in time routers R1 and R2 have established an adjacency.

During a switchover from the active controller 102a to the standby controller 102s, the adjacency will be broken unless a graceful restart process is employed. In a graceful restart, when a router's control plane goes down its neighbors, rather than immediately reporting to their own neighbors that the router has become unavailable, wait a certain amount of time referred to as the grace period. If the router's control plane comes back up and reestablishes communication with its neighbors before the grace period expires (as would be the case during a control plane switchover from the active to the standby controller), the adjacency is maintained and the temporary disruption does not effect the network beyond the failed router's immediate neighbors. However, as previously mentioned, conventional graceful restart processes require both the failed router and its neighbors to support graceful restart extensions or enhancements to the link state routing protocol. Not all routers support such routing protocol extensions.

To accomplish a graceful restart after performing a controller switchover, the standby controller 102s initializes itself with the LSA headers stored in the timer and memory manager 118 of the active controller 102a, which LSA headers were provided to the active controller in the Database Description packets. The LSA headers can be communicated to the standby controller 102s by the DBSync manager 116 in the active controller 102a. This initialization process is performed before the switchover occurs and may be performed on a periodic basis to ensure that the LSA header information remains synchronized between the two controllers.

Synchronization or replication of the LSA header information in this manner is relatively easy and scalable in comparison to a process that synchronizes the LSAs themselves. This is because the LSA are small in size (e.g., 20 bytes in the case of the OSPF routing protocol), whereas the LSAs can be very large with variable sizes, which makes replication or synchronization more difficult.

Figure 3:
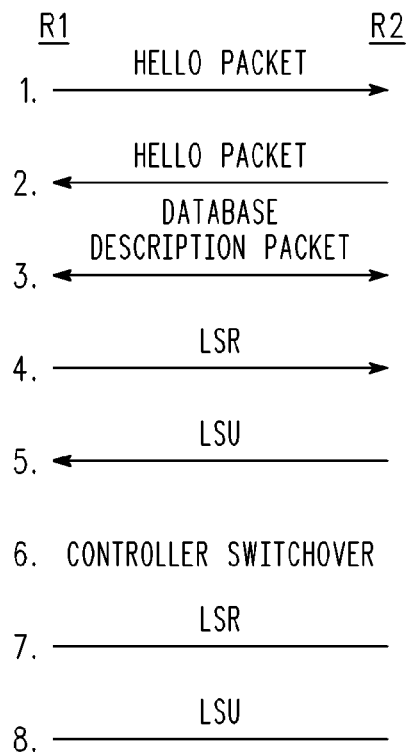
FIG. 3 is a signaling diagram showing how a graceful restart can be performed after the switchover.

If the active controller 102a stops operation, either by operator directive or by failure, the router operations is switched (i.e., switchover) to the standby controller and all OSPF protocol operations are performed on the standby controller FIG. 3 is a signaling diagram showing how a graceful restart can be performed after the switchover. Signaling messages 1-5 in FIG. 3 correspond to signaling messages 1-5 in FIG. 2 in which adjacency is established between routers R1 and R2. At some later time, the switchover occurs, as indicated at 6 in FIG. 3. Next, at 7, the standby controller 102s examines the LSA headers. The LSA headers identify all the LSAs that the standby controller needs to remain in adjacency. Accordingly, the standby controller 102s can generate an LSR requesting the LSAs from its neighbors. The standby controller 102s in router R1 sends the LSR at 7 in FIG. 3. By using an LSR in this manner after adjacency has been established the link state databases in the router undergoing the switchover can be quickly synchronized with its neighbors well within the grace period, thereby maintaining adjacency. Finally, at 8, the router R2 responds with an LSU that includes the requested LSRs.

Figure 4:
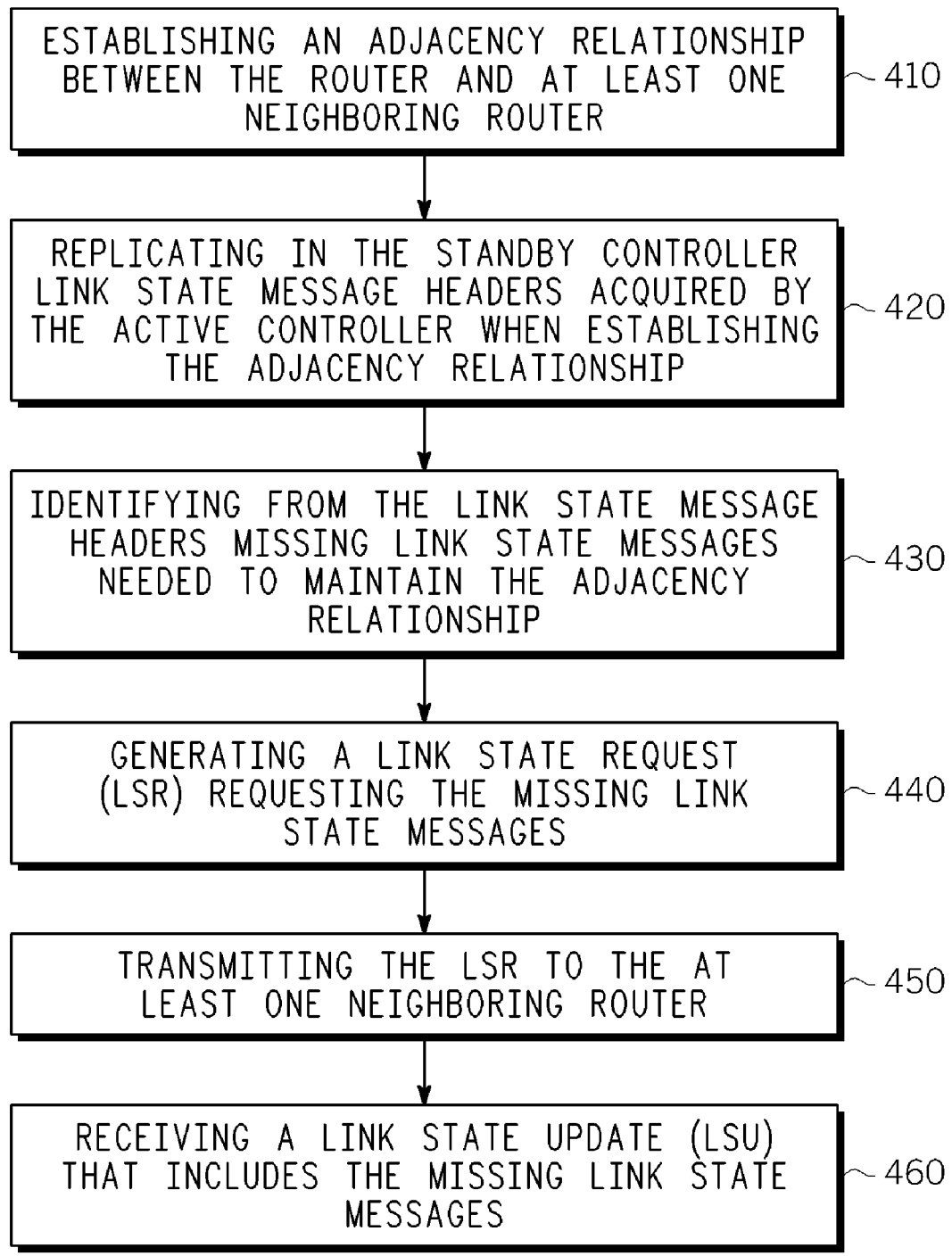
FIG. 4 is flowchart showing one particular example of a method of migrating link state routing processes from an active controller to a standby controller in a Non-Stop Forwarding (NFS)-capable router.

FIG. 4 is flowchart showing one particular example of a method of migrating link state routing processes from an active controller to a standby controller in a Non-Stop Forwarding (NFS)-capable router. The method begins in step 410 when the router first comes on-line and establishes an adjacency relationship between the router and at least one neighboring router. Link state message headers are acquired by the active controller when establishing the adjacency relationship. These link state message headers are replicated in the standby controller in step 420. In step 430 the standby controller uses the link state message headers to identify any missing link state messages that are needed to maintain the adjacency relationship. In step 440 a Link State Request (LSR) is generated requesting the missing link state messages and in step 450 the LSR is transmitted to the neighboring router or routers. In response to the transmitted LSR, a Link State Update (LSU) is received in step 460 that includes the missing link state messages.

The processes in FIGS. 2-4 may be implemented in hard wired devices, firmware or software running in a processor. A processing unit for a software or firmware implementation is preferably contained in the CMTS. Any of the processes illustrated in FIGS. 2-4 may be contained on a computer readable medium which may be read by controller 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

A method and apparatus has been described for migrating link state routing processes from an active controller to a standby controller in a Non-Stop Forwarding (NFS)-capable router. Accordingly, all states of the link state protocol immediately function as if a failure had not occurred. Such a switchover between controllers is transparent to the other routers in the network so that packet distribution continues unimpeded. That is, the neighboring routers will not observe any substantial traffic differences during or after the switchover, and the link state routing protocol that is employed does not require any extensions or enhancements. Accordingly, the router's forwarding capability will remain unaffected and a neighbor router will not notice that a system failure/maintenance event has occurred.

The invention claimed is:

1. A method of migrating link state routing processes from an active controller to a standby controller in a Non-Stop Forwarding (NFS)-capable router, comprising:
   establishing an adjacency relationship between the router and at least one neighboring router;
   replicating, in the standby controller, link state message headers acquired by the active controller when establishing the adjacency relationship;
   identifying from the link state message headers in the standby controller any missing link state messages that are needed to maintain the adjacency relationship;
   generating a Link State Request (LSR) requesting the missing link state messages;
   transmitting the LSR to the at least one neighboring router; and
   in response to the transmitted LSR, receiving a Link State Update (LSU) that includes the missing link state messages.

2. The method of claim 1 wherein the link state messages are Link State Advertisements (LSAs).

3. The method of claim 1 further comprising performing a switchover from the active controller to the standby controller after replicating the link state message headers in the standby controller.

4. The method of claim 1 wherein the switchover is performed as a result of a failure or in response to an operative directive.

5. The method of claim 2 wherein the LSAs, LSRs and the LSU conform to a common link state routing protocol.

6. The method of claim 5 wherein the link state routing protocol is a BGP routing protocol.

7. The method of claim 5 wherein the link state routing protocol is an IGP routing protocol.

8. The method of claim 7 wherein the IGP routing protocol is an OSPF routing protocol.

9. The method of claim 1 wherein the LSU is received during a graceful restart period.

10. The method of claim 1 wherein the link state messages are acquired by the active controller from Database Description packets received when establishing the adjacency relationship.

11. At least one non-transitory computer-readable medium encoded with instructions which, when executed by a processor, performs the method set forth in claim 1.

12. A router, comprising:
   a forwarding engine for forwarding packets to neighboring routers in a network;
   a first routing controller processor operatively coupled to the forwarding engine for running routing protocol processes;
   a standby routing controller operatively coupled to the first routing controller and the forwarding engine for running routing protocol processes; and
   wherein the standby routing controller is configured to perform a graceful restart by transmitting to neighboring routers a Link State Request (LSR) requesting missing link state messages identified from previously received link state message headers.

13. The router of claim 12 wherein the missing link state message comprise Link State Advertisements (LSAs).

14. The router of claim 12 wherein the standby routing controller performs the graceful restart by transmitting the LSR to neighboring routers with which it forms an adjacency.

15. The router of claim 12 wherein the forwarding engine is configured to perform NSF.

16. The router of claim 12 wherein the first routing processor includes a database synchronization manager configured to communicate the link state message headers to the standby routing processor.

17. The router of claim 12 wherein the standby routing controller includes a database synchronization manager configured to receive the missing link state messages from the neighboring routers.

18. The router of claim 13 wherein the LSAs, LSRs and the LSU conform to a common link state routing protocol.

19. The router of claim 18 wherein the link state routing protocol is an IGP routing protocol.

20. The router of claim 19 wherein the IGP routing protocol is an OSPF routing protocol.

\* \* \* \* \*